(12) United States Patent
Liu

(10) Patent No.: US 8,229,038 B2
(45) Date of Patent: Jul. 24, 2012

(54) TRANSCEIVER APPARATUS, RECEIVER AND POWER SAVING METHOD THEREOF

(75) Inventor: Tsu-Chun Liu, Hsin-Chu (TW)

(73) Assignee: IC Plus Corp., Hsin-Chu (TW)

( * ) Notice: Subject to any disclaimer, the term of this patent is extended or adjusted under 35 U.S.C. 154(b) by 795 days.

(21) Appl. No.: 12/265,987

(22) Filed: Nov. 6, 2008

(65) Prior Publication Data

US 2010/0086011 A1    Apr. 8, 2010

(30) Foreign Application Priority Data

Oct. 3, 2008 (TW) ................................ 97138274 A

(51) Int. Cl.
*H04L 27/06* (2006.01)
*H03D 1/00* (2006.01)

(52) U.S. Cl. ..................... 375/341; 275/219

(58) Field of Classification Search .......... 375/219, 375/340, 341; 713/323
See application file for complete search history.

(56) References Cited

U.S. PATENT DOCUMENTS

| | | | | |
|---|---|---|---|---|
| 5,923,711 | A * | 7/1999 | Willming | 375/287 |
| 6,026,150 | A * | 2/2000 | Frank et al. | 379/90.01 |
| 6,075,814 | A * | 6/2000 | Yamano et al. | 375/222 |
| 7,778,609 | B2 | 8/2010 | Weng et al. | 455/69 |
| 2005/0097378 | A1* | 5/2005 | Hwang | 713/320 |
| 2006/0050814 | A1* | 3/2006 | Wu et al. | 375/341 |
| 2008/0159415 | A1* | 7/2008 | Miller et al. | 375/258 |
| 2009/0119524 | A1* | 5/2009 | Hays | 713/322 |

FOREIGN PATENT DOCUMENTS

| | | |
|---|---|---|
| JP | 07-154779 | 6/1995 |
| JP | 2002-25200 | 1/2002 |
| JP | 2006-338781 | 12/2006 |
| JP | 2007-207351 | 8/2007 |
| JP | 2007-234174 | 9/2007 |

OTHER PUBLICATIONS

Japanese Examination Report of Japan Application No. 2008-290815, dated Jan. 28, 2011.

* cited by examiner

*Primary Examiner* — Shuwang Liu
*Assistant Examiner* — David Huang
(74) *Attorney, Agent, or Firm* — J.C. Patents

(57) ABSTRACT

A transceiver apparatus, a receiver and a power saving method thereof are provided. The receiver includes an analog-to-digital converter, an equalizer, a slicer, a delay unit, a decoder, a select unit and a control unit. The analog-to-digital converter transforms a received signal into a digital signal. The equalizer adjusts the digital signal to generate an equalized signal. The slicer receives and slices the equalized signal and generates a sliced signal. The delay unit delays the sliced signal. The decoder determines whether to decode the equalized signal or not according the control signal. The select unit selects one of the output of the delayed sliced signal and the output of the decoder to be an output signal according to a second control signal. The control unit determines whether to enable the control signal and the second control signal according to the state of the sliced signal and the output signal.

5 Claims, 3 Drawing Sheets

TRANSCEIVER APPARATUS, RECEIVER AND POWER SAVING METHOD THEREOF

CROSS-REFERENCE TO RELATED APPLICATION

This application claims the priority benefit of Taiwan application serial no. 97138274, filed Oct. 3, 2008. The entirety of the above-mentioned patent application is hereby incorporated by reference herein and made a part of this specification.

BACKGROUND OF THE INVENTION

1. Field of the Invention

The present invention relates to a transceiver apparatus and in particular, to a transceiver apparatus, a receiver and a power saving method thereof.

2. Description of Related Art

In a network communication system, a transceiver apparatus is usually used to be a transmission media of a signal. The transceiver apparatus is usually constituted by a transmitter (TX) and a receiver (RX), wherein the TX is used to output the signal, and the RX is used to receive the signal.

Generally, during a signal transmission process of the transceiver apparatus, the transceiver apparatus is not always in a data-transmission state. That is to say, the transceiver apparatus may be in an idle state during the signal transmission process. In other words, there are no data being transmitted in the signal transmission process. Furthermore, in gigabit Ethernet, the receiver may include a viterbi decoder to reduce a bit error rate. The viterbi decoder itself does not have a mechanism of detecting the state of the signal (i.e., the viterbi decoder does not detect whether the signal is in the data-transmission state or in the idle state) and the power consumption of the viterbi decoder is considerably high, so the conventional transceiver apparatus consumes excessive power.

SUMMARY OF THE INVENTION

The present invention provides a transceiver apparatus, a receiver, and a power saving method thereof, so as to reduce the power consumption.

The present invention provides a receiver receives a received signal transmitted by a remote device. The receiver includes an analog-to-digital converter, an equalizer, a slicer, a delay unit, a decoder, and a select unit, and a control unit. The analog-to-digital converter transforms the received signal into a digital signal. The equalizer is coupled to the analog-to-digital converter, and adjusts the digital signal to generate an equalized signal. The slicer is coupled to the equalizer. The slicer receives and slices the equalized signal and generates a sliced signal. The delay unit is coupled to the slicer for delaying the sliced signal. The decoder is coupled to the equalizer and determines whether to decode the equalized signal or not according to a control signal. The select unit is coupled to the slicer and the decoder, and selects one of the output of the delayed sliced signal and the output of the decoder to be the output signal according to a second control signal. A control unit is coupled to the slicer and the select unit and determines whether to enable the control signal and the second control signal according to the state of the sliced signal and the output signal.

According to one embodiment of the present invention, the control unit enables the control signal when the control unit detects that the sliced signal has a start of a stream delimiter (SSD) of the received signal; the control unit disables the control signal when the control unit detects that the output signal has an end of the stream delimiter (ESD) of the received signal, and does not detect that the sliced signal has the SSD of the received signal before or after a predetermined time.

According to one embodiment of the present invention, the control unit enables the second control signal after a predetermined time when the control unit detects that the sliced signal has the SSD of the received signal; the control unit disables the second control signal when the control unit detects that the output signal has the ESD of the received signal, and does not detect that the sliced signal has the SSD of the received signal before or after a predetermined time.

According to one embodiment of the present invention, the decoder is a viterbi decoder.

The present invention provides a transceiver apparatus having the receiver.

The present invention provides a power saving method of a receiver, the receiver includes a decoder, and the power saving method comprises steps as follows. First of all, a received signal is received. Next, whether the received signal is in an idle state is detected. Then, when the received signal is in the idle state, a control signal is disabled to control the decoder to stop operation.

According to one embodiment of the present invention, the step of detecting whether the received signal is in the idle state further includes enabling the control signal when the received signal is not in the idle state, so as to control the decoder to decode the received signal.

The present invention utilizes the control unit in the receiver to detect the state of the sliced signal (i.e., the state of the received signal), and generates the control signal correspondingly. That is to say, when the sliced signal (received signal) is in the idle state, the control unit disables the control signal; when the sliced signal (received signal) is in a data-transmission state, the control unit enables the control signal. After that, the decoder determines whether to decode the received signal according to the state of the control signal. That is to say, when the control signal is disabled, the decoder stops decoding the received signal (i.e., the decoder is in a non-operation state), the control unit controls the select unit to select the delayed sliced signal to be an output signal of the receiver; when the control signal is enabled, the decoder decodes the received signal (i.e., the decoder is in an operation state), the control unit controls the select unit to select the output of the decoder to be the output signal of the receiver. Accordingly, the present invention may reduce the power consumption of the receiver effectively.

In order to make the aforementioned and other objects, features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
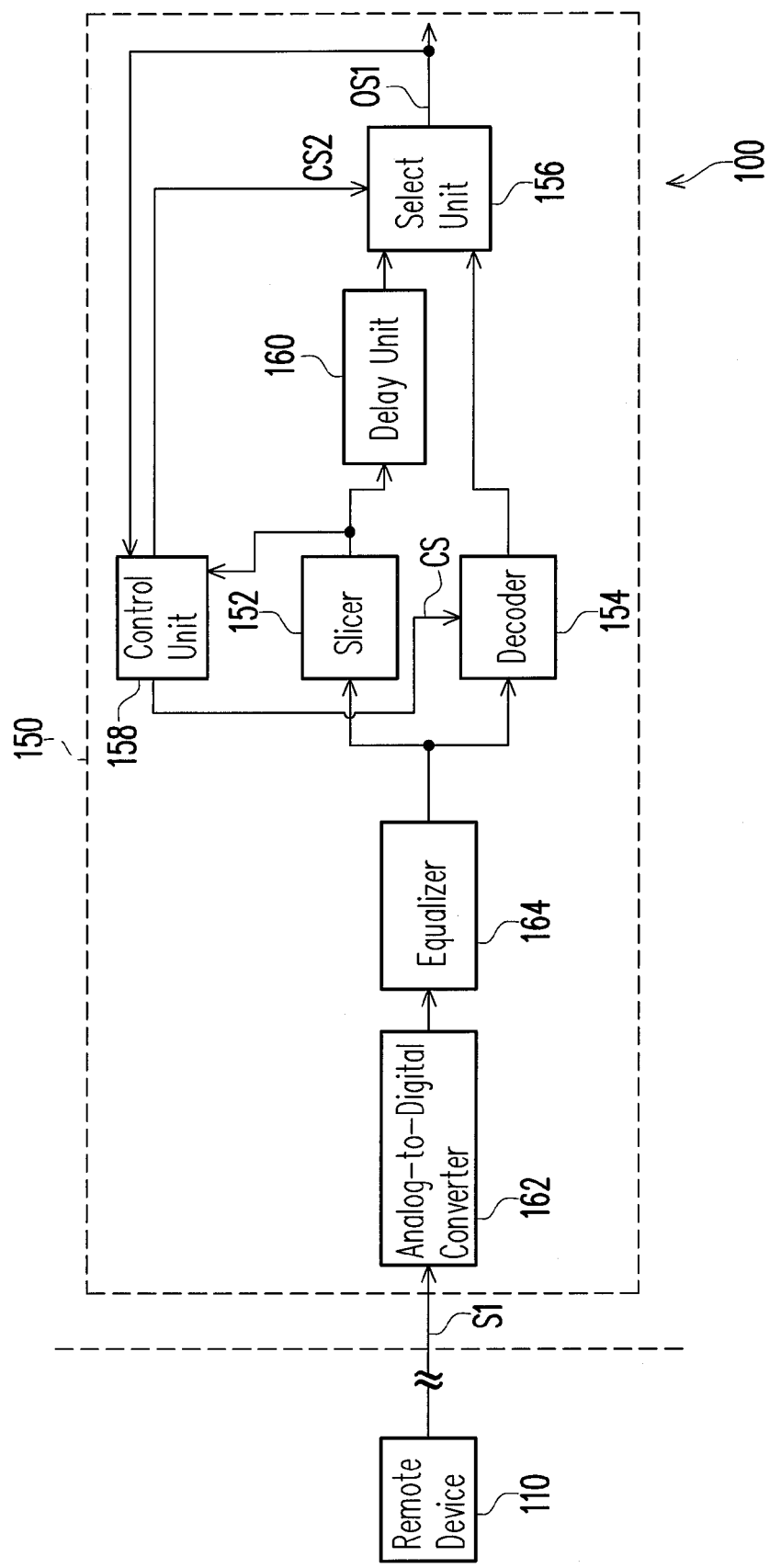
FIG. 1 is a block diagram illustrating a transceiver apparatus according to one embodiment of the present invention.

FIG. 1 is a block diagram illustrating a transceiver apparatus according to one embodiment of the present invention. According to the present embodiment, the transceiver apparatus 100 can be applied to, but not limited to, Gigabit Ethernet. Please refer to FIG. 1, the transceiver apparatus 100 includes a receiver 150. The receiver 150 is used to receive a received signal S1 transmitted by a remote device 110. According to the embodiment of the present application, the received signal S1 is a continuous signal. That is to say, after the transceiver apparatus 100 starts to operate, the receiver 150 continuously receives the received signal S1 outputted from the remote device 110.

Generally, the received signal S1 is in an idle state or a data-transmission state during a transmission process. In the idle state, the remote device 110 transmits a 3-level voltage signal, i.e., 1, 0, and −1. In the data-transmission state, the remote device 110 transmits a 5-level voltage signal, i.e., 1, 0.5, 0, −0.5, and −1.

Continuing to refer to FIG. 1, the receiver 150 includes an analog-to-digital converter (ADC) 162, an equalizer 164, a slicer 152, a delay unit 160, a decoder 154, a select unit 156, and a control unit 158. The analog-to-digital converter 162 transforms the received signal S1 into a digital signal. The equalizer 164 is coupled to the analog-to-digital converter 162, and adjusts the digital signal to generate an equalized signal ES.

The slicer 152 is coupled to the equalizer 164. The slicer 152 receives and slices the equalized signal ES and generates a sliced signal. According to the embodiment of the present invention, the decoder 154 requires a predetermined time to decode the equalized signal ES to obtain a correct decode signal. Furthermore, it takes different time for the slicer 152 and the decoder 154 to process the equalized signal ES. The delay unit 160 may be coupled to the slicer 152 for delaying the sliced signal in order to synchronize the output of the decoder 154, and the output of the sliced signal to be transmitted to the select unit 156, so as to prevent the receiver 150 from generating a wrong decode signal.

The decoder 154 determines whether to decode the equalized signal ES according to a control signal CS. For example, when the control signal CS is enabled, the decoder 154 decodes the equalized signal ES. That is to say, the decoder 154 is in an operation state. On the contrary, when the control signal CS is disabled, the decoder 154 does not decode the equalized signal ES, i.e., the decoder 154 is in a non-operation state. Thereby, according to the embodiment of the present invention, the receiver 150 may reduce the power consumption effectively. According to the embodiment of the present invention, the decoder 154 may be a viterbi decoder for processing the 5-level voltage signal. Moreover, the slicer 152 is used to process the 3-level voltage signal.

The select unit 156 is coupled to the slicer 152 and the decoder 154. The select unit 156 selects one of the output of the delayed sliced signal (i.e., the output of the delay unit 160) and the output of the decoder 154 to be an output signal OS1 according to a second control CS2. For example, when the decoder 154 does not decode the equalized signal ES, the second control signal CS2 is disabled, so that the select unit 156 selects the delayed sliced signal to be the output signal OS1. When the decoder 154 decodes the equalized signal ES, the second control signal CS2 is enabled, so that the select unit 156 selects the output of the decoder 154 to be the output signal OS1. According to the embodiment of the present invention, the select unit 156 may be a multiplexer.

The control unit 158 may detect the sliced signal and the output signal OS1 to determine whether to enable the control signal CS and the second control signal CS2, which forms the basis for determining whether the decoder 154 is required to be put into the non-operation state or the operation state, and the basis for the select unit 156 to select one of the output of the delayed sliced signal and the output of the decoder 154 to be the output signal OS1.

It should be noted that, according to the embodiment of the present invention, the slicer 152 is used to process the 3-level voltage signal while the decoder 154 is used to process the 5-level voltage signal. Thereby, when the receiver 150 decodes the received signal S1, a bit error rate is effectively decreased.

Figure 2:
FIG. 2 is a schematic view of a received signal according to one embodiment of the present invention.

In order for persons of ordinary skill in the art to understand how to control the operation of the decoder, an example is provided hereinafter for illustration. FIG. 2 is a schematic view of a received signal according to one embodiment of the present invention. Referring to FIG. 2, the symbol "Idle" represents that the received signal S1 is in the idle state; the symbols "SSD1" and "SSD2" represent a start of a stream delimiter (SSD) in the received signal S1; the symbol "Data" represents that the received signal S1 is in the data-transmission state; the symbol "Csreset" represents a reset period, i.e., the received signal S1 is about to be switched from the data-transmission state to the idle state; and the symbols "ESD1" and "ESD2" represent an end of the stream delimiter (ESD) in the received signal S1. According to the embodiment of the present invention, for a simple description, the state of the received signal S1 is respectively represented by the symbols including "Idle", "SSD1", "SSD2", "Data", "Csreset", "Csreset", "ESD1", "ESD2", "Idle", and etc.

Please refer to FIGS. 1 and 2, first of all, the received signal S1 is in the idle state; therefore, after the slicer 152 processes the equalized signal ES, the sliced signal generated is also in the idle state. As a result, the control unit 158 disables the control signal CS and the second control signal CS2 according the idle state of the sliced signal, and thereby the decoder 154 stops operation and the select unit 156 selects the delayed sliced signal to be the output signal OS1.

Next, the slicer 152 continues to process the equalized signal ES, and when the control unit 158 detects that the sliced signal has the SSD1 of the received signal S1 (i.e., the received signal S1 is switched to the data-transmission state from the idle state), the control signal CS is enabled to put the decoder 154 into the operation state. It takes a period of time for the decoder 154 to complete the process of decoding the equalized signal ES (received signal S1), the period of time is approximately a memory length, and the memory length may be adjusted by a user. Therefore, when the control unit 158 enables the control signal CS, and the decoder 154 outputs the effective decode signal after a predetermined time (i.e., the memory length), the control unit 158 enables the second control signal CS2, so that the select unit 156 selects the output of the decoder 154 to be the output signal OS1.

After that, the decoder 154 continues to process the equalized signal ES, and the select unit 156 continues to select the output of the decoder 154 to be the output signal OS1. According to the embodiment of the present invention, an inter packet gap (IPG) is the time interval between the previous data-transmission state and the next data-transmission state of the successive data packets of the received signal S1, i.e., the time that the received signal S1 is in the idle state. Therefore, when the control unit 158 detects that the output signal OS1 has the ESD1 and the ESD2 of the received signal S1 (i.e., a packet transmission process of the received signal S1 is completed, and the received signal S1 is to be switched to the idle state from the data-transmission state), the control unit 158 further determines whether the inter packet gap is larger than the memory length.

If the inter packet gap is longer than the predetermined time, it means that the received signal S1 has a longer idle time, (i.e., at the same time when the control unit 158 detects that the output signal OS1 has the ESD1 of the received signal S1 and does not detect that the sliced signal has the SSD1 of next data packet of the received signal S1 before or after the predetermined time), and therefore, the control unit 158 disables the control signal CS and the second control signal CS2, so that the decoder 154 stops operation and the select unit 156 selects the delayed sliced signal to be the output signal OS1. Thereby, according to the embodiment of the present invention, the receiver 150 may reduce the power consumption effectively.

On the contrary, if the inter packet gap is shorter than the predetermined time, it means that the idle time of the received signal S1 is shorter (the next data packet is generated when the decoder 154 has not yet finished processing the previous data packet), i.e., the control unit 158 detects that the output signal OS1 has the ESD1 of the received signal S1 and detects that the sliced signal has the SSD1 of the received signal S1. At the same time, the control signal 158 continues to enable the control signal CS and the second control signal CS2, so that the decoder 154 continues operating, and thereby the decoder 154 may decodes the next data packet right after the previous data packet is decoded, and the select unit 156 continues to select the output of the decoder 154 to be the output signal OS1, so as to prevent outputting the wrong decode signal to be the output signal OS1.

Figure 3:
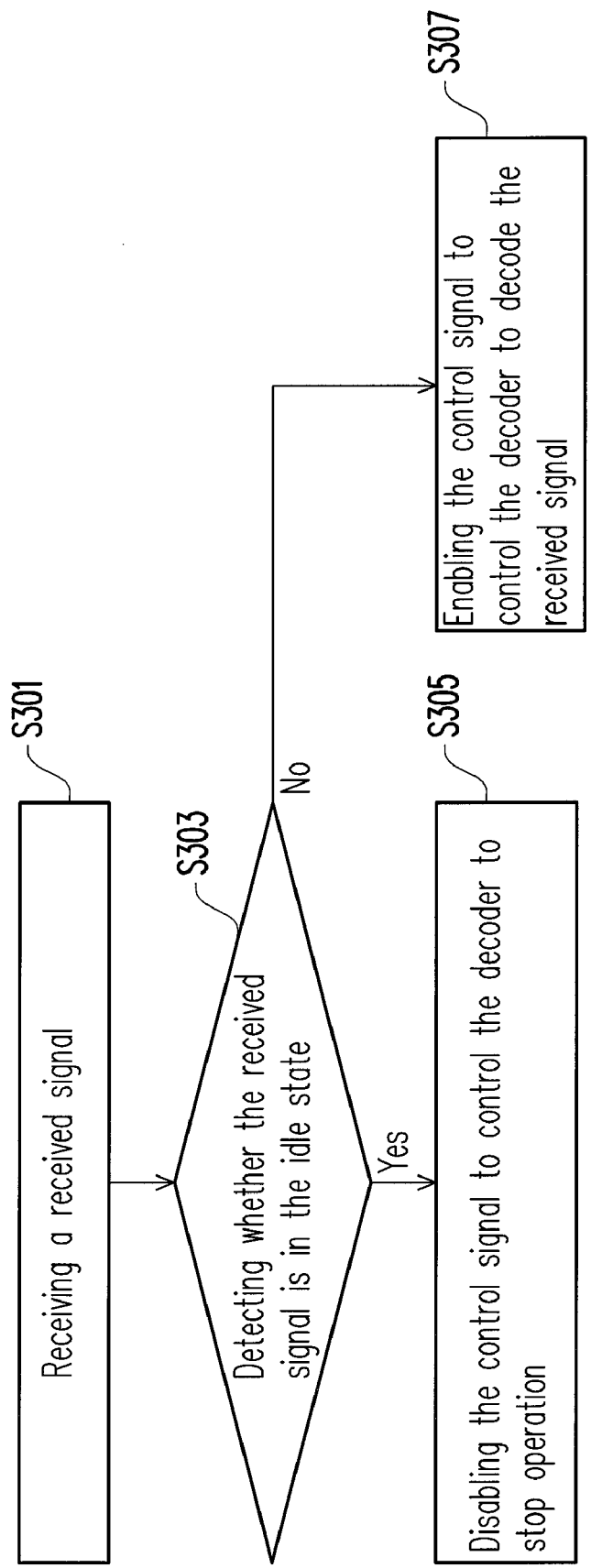
FIG. 3 is a flow chart showing a power saving method according to one embodiment of the present invention.

From the descriptions of the aforesaid embodiment, a power saving method of the receiver can be deduced. FIG. 3 is a flow chart showing a power saving method of the receiver according to one embodiment of the present invention. According to the embodiment of the present invention, the receiver may include a decoder, for example but not limited to, a viterbi decoder. Please refer to FIG. 3. First, in a step S301, a received signal is received, i.e., the receiver receives the received signal outputted from the remote device.

Next, a step S303 is entered to detect whether the received signal is in the idle status, so as to control the decoder to be in the operation state. When the received signal is in the idle status, a step S305 is entered to disable the control signal so as to control the decoder to stop operation. Then, when the decoder stops operation, the control unit of the receiver disables the second control signal, so that the select unit does not select the output of the decoder to be the output signal of the receiver.

On the other hand, when it is detected that the received signal is not in the idle status (i.e., in the data-transmission state), a step S307 is entered to enable the control signal, so as to control the decoder to decode the received signal. After that, when the decoder decodes the received signal, the control unit of the receiver enables the second control signal, so that the select unit selects the output of the decoder to be the output signal of the receiver, and thereby the receiver of the present embodiment may reduce the power consumption effectively.

In summary, the present invention utilizes the control unit in the receiver to detect the state of the sliced signal (i.e., the state of the received signal), and generates the control signal correspondingly. That is to say, when the sliced signal (received signal) is in the idle state, the control unit disables the control signal; when the sliced signal (received signal) is in the data-transmission state, the control unit enables the control signal. Thereafter, the decoder determines whether to decode the received signal according to the state of the control signal. That is to say, when the control signal is disabled, the decoder stops decoding the received signal (i.e., the decoder is in the non-operation state), and the control unit controls the select unit to select the delayed sliced signal to be the output signal of the receiver; when the control signal is enabled, the decoder decodes the received signal (i.e., the decoder is in the operation state), and the control unit controls the select unit to select the output of the decoder to be the output signal of the receiver. Accordingly, the present invention may reduce the power consumption of the receiver.

Although the present invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A receiver, for receiving a received signal transmitted by a remote device, the receiver comprising:
   an analog-to-digital converter, for transforming the received signal into a digital signal;
   an equalizer, coupled to the analog-to-digital converter, for adjusting the digital signal to generate an equalized signal;
   a slicer, coupled to the equalizer, for receiving and slicing the equalized signal and generating a sliced signal;
   a delay unit, coupled to the slicer, for delaying the sliced signal;
   a decoder, coupled to the equalizer, for determining whether to decode the equalized signal or not according to a first control signal;
   a select unit, coupled to the slicer via the delay unit and the decoder, for selecting one of an output of the delay unit and an output of the decoder to be an output signal according to a second control signal; and
   a control unit, coupled to the slicer and the select unit, for determining whether to enable the first control signal and the second control signal according to the state of the sliced signal and the output signal.

2. The receiver according to claim 1, wherein when the control unit detects that the sliced signal has a start of a stream delimiter of the received signal, the control unit enables the first control signal; when the control unit detects that the output signal has an end of the stream delimiter of the received signal, and does not detect that the sliced signal has the start of the stream delimiter of the received signal before or after a predetermined time, the control unit disables the first control signal.

3. The receiver according to claim 1, wherein when the control unit detects that the sliced signal has a start of a stream delimiter of the received signal, the control unit enables the second control signal after a predetermined time; when the control unit detects that the output signal has an end of the stream delimiter of the received signal, and does not detect that the sliced signal has the start of the stream delimiter of the received signal before or after a predetermined time, the control unit disables the second control signal.

4. The receiver according to claim 1, wherein the decoder is a viterbi decoder.

5. A transceiver apparatus having the receiver of claim 1.

* * * * *